May 5, 1931.  R. VON KRENSKI  1,803,953

POWER TRANSMITTING FRICTION WHEEL

Filed May 9, 1927

Inventor:
R. Von Krenski

By: Marks & Clerk
Attys.

Patented May 5, 1931

1,803,953

UNITED STATES PATENT OFFICE

ROMAN von KRENSKI, OF BERLIN-CHARLOTTENBURG, GERMANY

POWER TRANSMITTING FRICTION WHEEL

Application filed May 9, 1927, Serial No. 190,099, and in Germany May 18, 1926.

My invention relates to a resilient power transmitting friction wheel, which is to be employed for example for the purpose of establishing a connection between the axle of a railway carriage and a dynamo serving for lighting purposes or the like. In this case I arrange the wheel itself between the axle and the dynamo shaft, so that by the initial stress under which the drive works it is simultaneously loaded at various points on its periphery. For this method of working I employ a tyre or peripheral surface covering on the transmission wheel, which is of such a nature that the periphery of the wheel, notwithstanding, the simultaneous loading at different points, remains resilient in a radial as well as in a tangential direction, and the springing of the wheel itself is not affected. A tyre or peripheral covering which fulfills this requirement may consist for example of a large number of inelastic segments, which are assembled, with the interposition of highly elastic bars, to form a ring, which, with initial stress, is carried pivotally and in a freely suspended manner by the rim of the wheel by means of suitable connecting members.

Now my invention relates to the employment of such a wheel and to the further development of this wheel in such a manner that an appliance is obtained, which, in the case of the transmission purposes hereinbefore mentioned by way of example, is capable of complying with the special constructional conditions there existing.

Thus very frequently important machine parts which pertain to railway working are invariably secured to the carriage at the point where the power transmission wheel is to be fitted in.

In the case of the use indicated above by way of example it is for the most part the important brake rod which precludes the provision of an intermediate driving wheel constructed in the manner of an ordinary spoke wheel or of an ordinary disc wheel.

According to my invention I eliminate this and other difficulties by mounting the resilient wheel periphery not upon a solid wheel with an axle supported in the centre thereof, but upon a ring.

Figure 1:
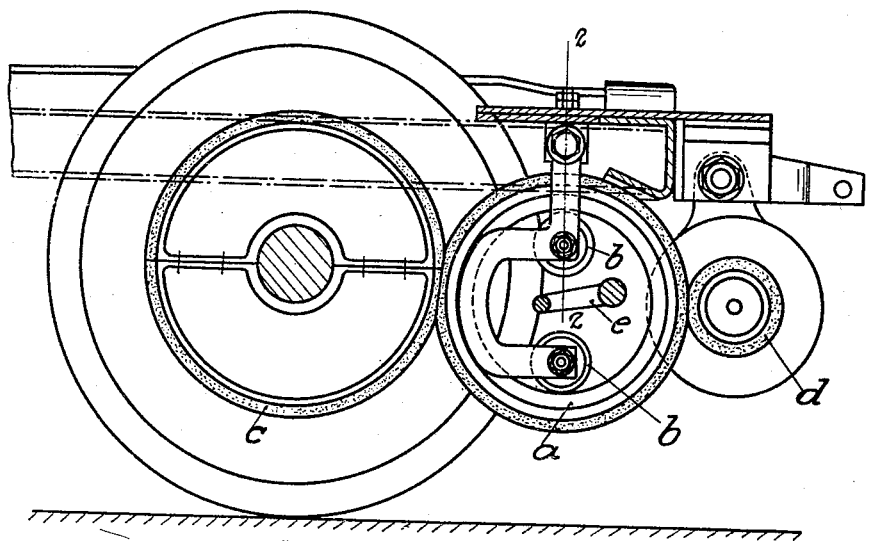
Figure 2:
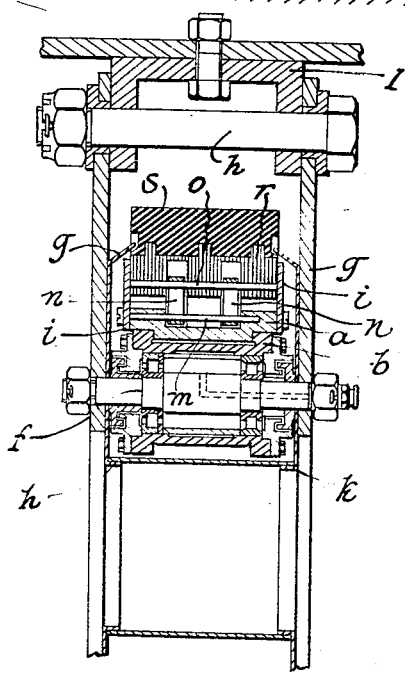

The construction of such a wheel is diagrammatically shown in the accompanying drawings, wherein Figure 1 is a side elevation of a constructional form of power transmission gearing fitted with the improved friction wheel and Figure 2 shows on a larger scale a vertical transverse section on the line 2—2 of Figure 1 through the upper part of the friction wheel and its mounting.

Referring to Figure 1, $c$ represents a wheel disc secured to the carriage axle, the periphery of the said wheel disc being constructed for example in the manner hereinbefore described. In frictional connection with the disc $c$ there is a ring $a$, the periphery of which in a radial and also in a tangential direction is resiliently held in such a way that simultaneous loads at different points at its periphery do not affect the springing of the wheel, and which transmits power from the wheel of the vehicle to the actual driving disc $d$. The supporting of the driving ring $a$ is in this case effected either by the ring rolling upon a ball bearing ring of correspondingly large diameter or by the ring $a$ running upon one or more rollers $b$, which are arranged either outside or inside the resilient hollow ring $a$ and which give the ring the necessary support and guidance.

$e$ is the brake rod, which passes through the intermediate wheel without either of them interfering with the other.

Referring to Figure 2, the roller B is journalled on a pin $f$ by means of an anti-friction bearing, such as a ball or roller bearing, the said pin being secured to arms $g$ suspended from a bolt $h$ passed through the channel-section member $l$ fixed to the bogie of the vehicle. The arms $g$ together with the top and bottom rollers $b$ (Fig. 1) are thus capable of swinging about the bolt $h$. The ring $a$ is provided with side walls $i$ between which the elastic tyre is arranged. A sheet metal casing $k$ surrounds the ring $a$ and the rollers $b$ to protect them from the entrance of foreign bodies, dust etc.

In the ring $a$ are secured bolts $m$ which are passed through hoops $n$ through which also pass bolts $o$ connected to the tyre $r$ itself, the said hoops holding the tyre in position between the cheeks or walls $i$. The tyre $r$ is similar in construction to the tyre described in U. S. patent specification No. 1,453,033 and comprises a plurality of non-elastic segments with elastic bars or plates interposed between them. On the tyre $r$ is fixed the tread $s$ which may consist of rubber vulcanized on or simply stretched over it.

As hereinbefore indicated I can also solve the problem under some circumstances by providing not the outer periphery of the coupling ring $a$ but the inner periphery thereof with the yielding running surface, if circumstances render this necessary.

What I claim is:—

The combination with the frame of a railway vehicle, an axle thereof and a driving friction wheel fixed on said axle, of a dynamo having a driven friction wheel fixed on its shaft, said dynamo being suspended from the frame of the vehicle, an annular coupling member interposed between said friction wheels and having an elastic tyre in engagement with the driving friction wheel and driven friction wheel for transmitting motion from the former to the latter without shocks, supporting means for said annular coupling member suspended from the frame of the vehicle and having rollers engaging the coupling member so as to enable the coupling member to rotate freely between the friction wheels, said supporting means having a gap capable of allowing other devices not belonging to the friction wheels and their supporting means to be passed through the annular coupling member and a brake actuating member passed through said coupling member and said gap, as and for the purposes set forth.

In testimony whereof I have signed my name to this specification.

ROMAN von KRENSKI.